(12) United States Patent
Eriksson

(10) Patent No.: US 6,334,406 B1
(45) Date of Patent: Jan. 1, 2002

(54) RETRACTION MEANS

(75) Inventor: Jan Eriksson, Uttran (SE)

(73) Assignee: DeLaval Holding, Tumba (SE)

( * ) Notice: Subject to any disclaimer, the term of this patent is extended or adjusted under 35 U.S.C. 154(b) by 0 days.

(21) Appl. No.: 09/555,782

(22) PCT Filed: Dec. 1, 1998

(86) PCT No.: PCT/SE98/02195

§ 371 Date: Jun. 5, 2000

§ 102(e) Date: Jun. 5, 2000

(87) PCT Pub. No.: WO99/27771

PCT Pub. Date: Jun. 10, 1999

(30) Foreign Application Priority Data

Dec. 4, 1997 (SE) .............................. 9704516

(51) Int. Cl.⁷ .............................. A01J 3/00; A01J 5/00
(52) U.S. Cl. .............................. 119/14.02; 119/14.08
(58) Field of Search .............................. 119/14.02, 14.05, 119/14.08, 14.1, 14.11, 14.18, 14.39

(56) References Cited

U.S. PATENT DOCUMENTS

| 3,893,422 | A | * | 7/1975 | Schnitzler et al. | ....... 119/14.08 |
|---|---|---|---|---|---|
| 3,938,470 | A | | 2/1976 | Pace | ......... 119/14.1 |
| 4,408,564 | A | * | 10/1983 | Flocchini | ........ 119/14.08 |
| 5,042,428 | A | * | 8/1991 | Van der Lely et al. | .... 119/14.1 |
| 5,379,722 | A | * | 1/1995 | Larson | ........ 119/14.1 |
| 5,937,786 | A | * | 8/1999 | Peacock | ........ 119/14.11 |
| 5,967,081 | A | * | 10/1999 | Street et al. | ........ 119/14.08 |
| 6,148,766 | A | * | 11/2000 | Van der Lely | ........ 119/14.08 |

FOREIGN PATENT DOCUMENTS

| DE | 4 438 236 | 11/1995 |
|---|---|---|
| EP | 0 630 556 | 12/1994 |
| EP | 0 647 391 | 4/1995 |
| EP | 0 728 412 | 8/1996 |
| FR | 2 593 668 | 8/1987 |
| WO | WO 96/01041 | 2/1996 |

* cited by examiner

Primary Examiner—Charles T. Jordan
Assistant Examiner—Elizabeth Shaw
(74) Attorney, Agent, or Firm—Young & Thompson

(57) ABSTRACT

An automatic retraction device for a tool (45) in a milking robot (39) comprises a selectively actuated counterweight (59) which can be used to retract the tool when necessary.

7 Claims, 3 Drawing Sheets

RETRACTION MEANS

CROSS REFERENCE TO RELATED APPLICATION

This is the 35 USC 371 national stage of international application PCT/SE98/02195 filed on Dec. 1, 1998, which designated the United States of America.

FIELD OF THE INVENTION

The present invention relates to a retraction device for hoses and cables used in a milking robot.

BACKGROUND OF THE INVENTION

Modem dairies often use milling robots to milk the dairy animals. A typical milking robot comprises a stall—where the animal stands while being milked, and a robot arm-which moves various tools from a parked idle position on the wall of the stall to a working position under the udder of the animal. These tools such as teat cleaning devices, premilking cups and milking cups can be connected by hoses or cables to various services such as, for example, a cleaning fluid supply, a power supply e.g an electrical cable, high-pressure hydraulic fluid, a flexible rotation shaft etc., a compressed air supply, a vacuum supply or a waste fluid collecting system Thus a tool with suitable cables and hoses can be moved from the parking position by the robot arm to a working position under the animal. When the tool is positioned under the udder the hoses and cables extend from the wall of the stall along the floor of the stall to the udder and the tool can be dislodged from the robot, or the hoses and cables damaged, if the animal moves or kicks the cable or hose. To reduce the risk of this happening each hose and cable or bundle of hoses can be fitted with a retraction spring which holds the hose or cable taut in the air. This however has the disadvantage that the forces on the robot arm vary as the cable or hose is pulled out or retracted and this makes it more difficult to accurately position the robot arm Furthermore if the spring force is made sufficiently large enough to return the tool to its parked position if it is dislodged from the robot arm then the power and strength of the robot arm must be increased which leads to a larger, heavier and more expensive arm. If the spring force is not sufficient to return the dislodged tool to its parking position then an alarm to call for manual assistance must be provided.

SUMMARY OF THE INVENTION

The object of the present invention is to provide milking tool retraction means which overcome the problems of the prior art.

In accordance with the invention, this object is achieved in a milking robot of the above kind by providing the cables or hoses with a counteract system able to normally only counteract the weight of the cable or hose but which is also capable of automatically counteracting the weight of the tool if it is dislodged from the robot arm.

In a preferred embodiment of the invention the counteract system is also able to assist in parking of tools.

This system has the advantage that in normal use the loads on the robot arm are minimised while permitting automatic parking of a dislodged tool.

BRIEF DESCRIPTION OF THE DRAWINGS

The invention will now be described by way of example with reference to the accompanying drawing in which.

DETAILED DESCRIPTION OF THE INVENTION

Figure 1A:
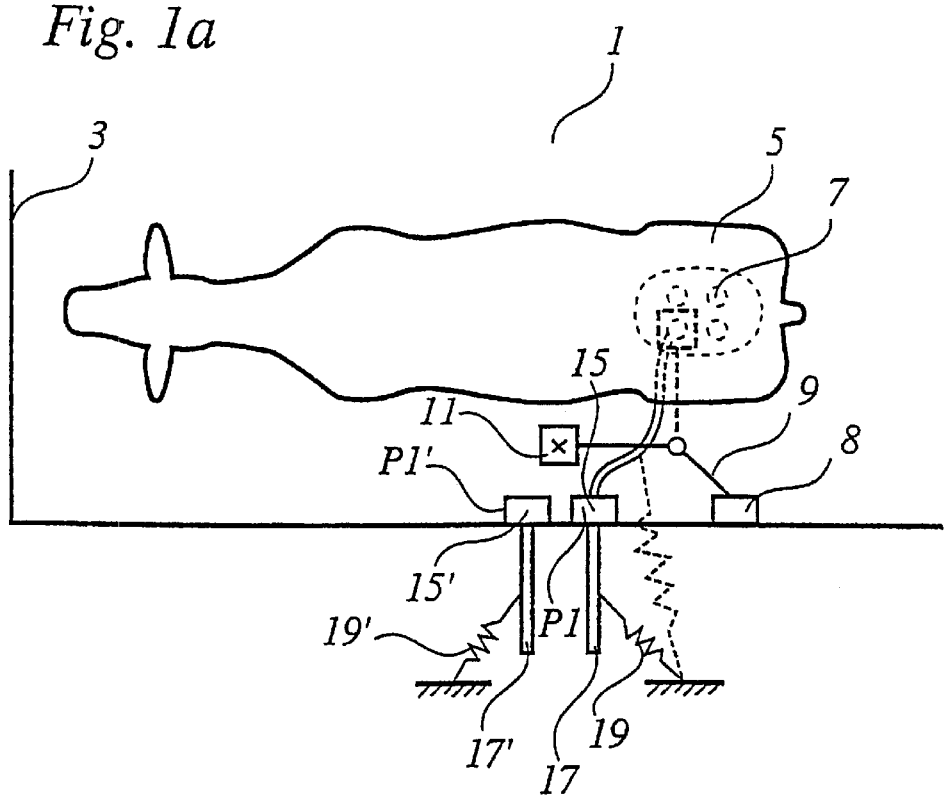
FIG. 1a) is a schematic plan view of a prior art milking robot.
Figure 1B:
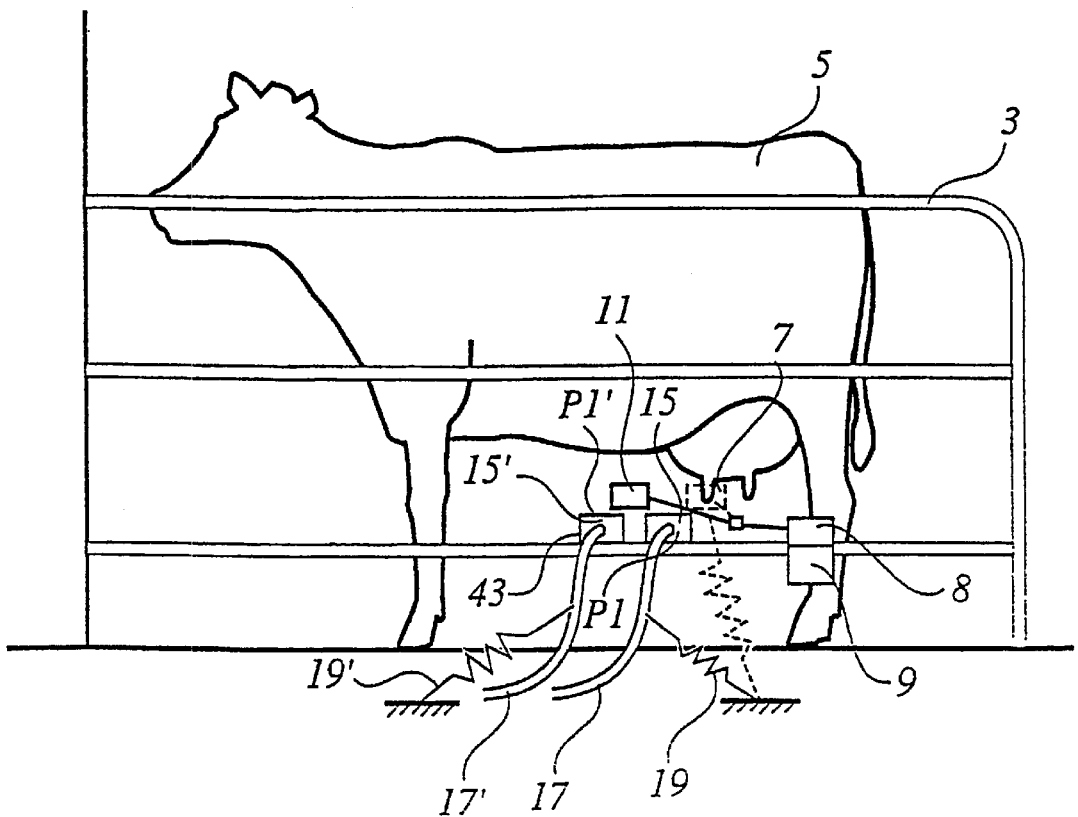
FIG. 1b) is a lateral view of the milking robot shown in FIG. 1a)

FIG. 1a) and 1b) show a prior art milking robot 1 comprising a stall 3 for an animal 5 with teats 7. Robot 1 has a, preferably computerised, controlling means 8 which controls an arm 9 which can move under the animal 5. Arm 9 has tool retaining means 11 which can co-operate with tool attachment means 13 on tools 15, 15'. Tools 15, 15' have parking positions P1. resp. P1' on the stall 3 when they are not in use. Tool 15 is shown by dashed lines attached to arm 9 and positioned under the teats 7. Each tool has a length of service cable 17, 17' which can consist of one or more air, water, vacuum or electricity supplies and which leads from the respective parking position P1, P1' to the respective tools 15, 15'. A cable retraction device shown schematically as a spring 19, resp. 19', holds the cable taut when the respective tool 15, 15' has been removed from its parking position P1, P1'.

Figure 2A:
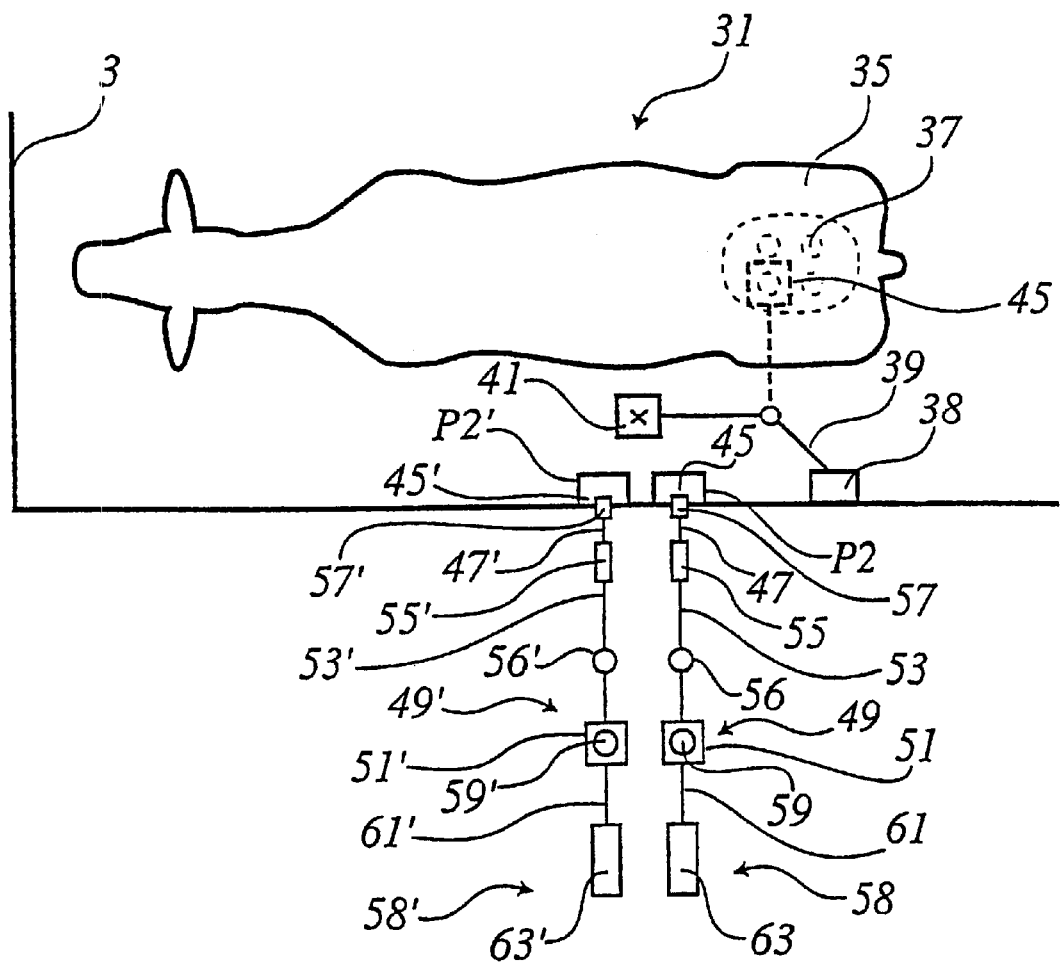
FIG. 2a) is a schematic plan view of a milking robot according an embodiment of the invention.
Figure 2B:
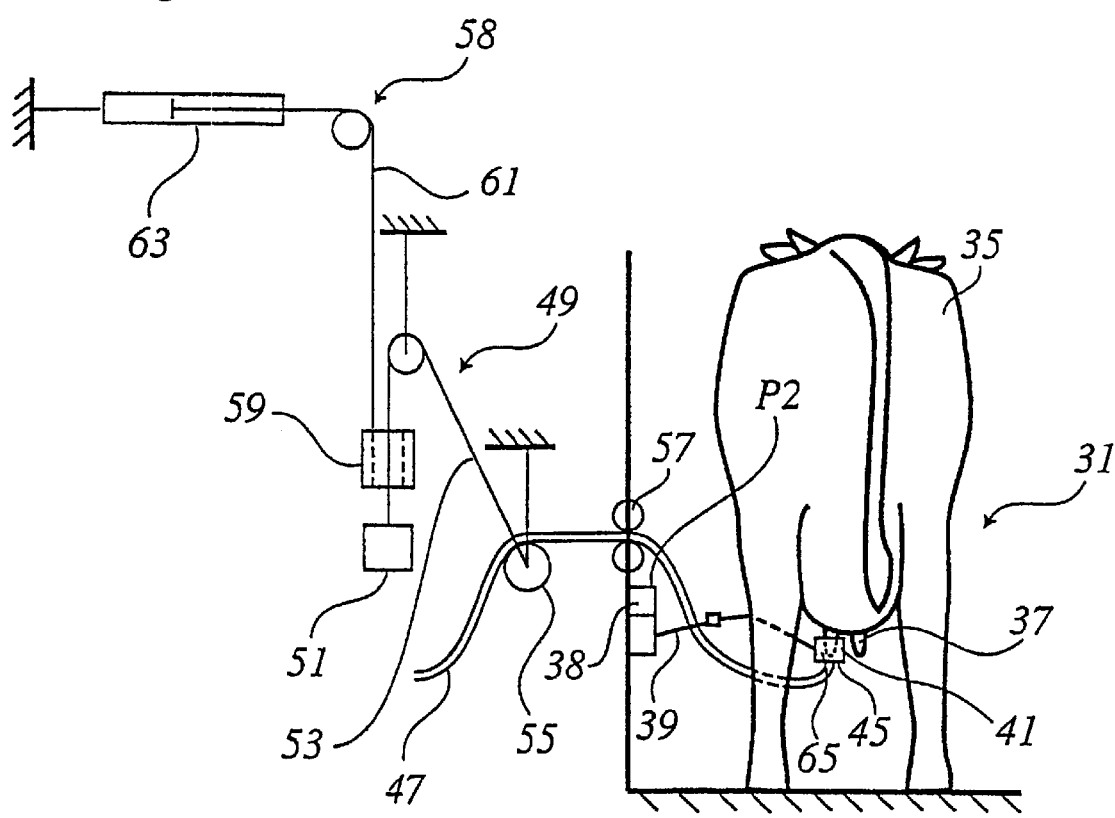
FIG. 2b) is a end view of the milling robot shown in FIG. 2a).

FIGS. 2a) and 2b) show an embodiment of a milling robot 31, provided with a parking means according to the present invention. Robot 31 comprising a stall 33 for an animal 35 with teats 37. Robot 31 has a, preferably computerised, controlling means 38 which controls an arm 39 which can move under the animal 35. Arm 39 has tool retaining means 41 which can co-operate with tool attachment means 43 on tools 45, 45'. Tools 45, 45' have parking positions P2, resp. P2' on the stall 33 when they are not in use. Tool 45 is shown by dashed lines attached to arm 39 and positioned under the teats 37. Each tool has a length of service cable 47, 47' which can consist of one or more air, water, vacuum or electricity supplies and which leads from the respective parking position P2, P2' to the respective tools 45, 45'. A counterbalancing device 49, 49' which counteracts the force of gravity acting on the cable 47, 47' holds the cable 47, 47' taut when the respective tool 45, 45' has been removed from its parking position P2, P2'. Each counterbalancing device 49, 49' comprises a first counterweight means comprising a first counterweight 51, 51' attached by a first attachment means such as a first wire 53, 53' to a first sliding support means such as pulley block 55, 55' supporting the cable 47, 47'. The first wire 53, 53' runs up from the first counterweight 51, 51' to a low-friction supporting means 56, 56' such as a pulley suspended from the fame 3 and then down to second guiding sliding support means such as a pair of pulleys 57, 57' attached to the stall 33. The first counterweight 51, 51 ' is sufficiently heavy so that the cable 47, resp 47' that it is attached to is lifted off the ground while at the same time the force exerted on the robot arm 39 is substantially constant in normal use. In order to return the tool 45, 45' to its parking position P2. P2' in the event of it being dislodged from the robot arm 39 a second counteracting means 58. 58' such as a counterweight means, comprising preferably a tubular counter weight 59,59' is provided above the first counterweight 51, 51' and is preferably situated around the part of the first wire 51, 51' leading from the first counterweight 51, 51' to the pulley 57, 57'. The second counterweight 59, 59' weighs more than the tool 45, 45' it is connected to and is supported above the first counterweight 51, 51' by a second wire 61, 61' connected to a force exerting means such as a hydraulic or vacuum actuator 63, 63'. Normally when there is a tool 45, 45' on the robot arm 39 the weight of the second counterweight 59, 59' is held fully supported by the actuator 63, 63' and thus the second counterweight 59, 59' exerts no force on the first counterweight system. The actuators 63, 63' are controlled by sensor means such as a micro-switch 65 on arm 39 which detects the presence or absence of a tool 45, 45' on arm 39. If a tool 45, 45' is dislodged from the robot arm 39 the sensor means 65 sends a signal to the respective actuator 63, 63'. This signal causes the actuator 63, 63' to release the second counterweight 59, 59' which then falls onto the first counterweight 51, 51'. The force exerted on the first wire 53, 53' is therefore increased to a value greater than the combined weights of the tool 45, 45' and cable 47, 47' which consequently are retracted to the parking position P2, P2'.

In situations where the occurrence of tools being dislodged is few then a sensor could be omitted and the retraction means could be automatically activated at the end, or some other appropriate part, of each cleaning cycle. In this way the counterbalance means can also be used to aid movement and positioning of the robot arm when it is returning the tool to the parking position Thus in another embodiment of the invention (not shown) the robot controlling device which controls the teat cleaning cycle is programmed to release the second counterweight at the point of each cycle when the tool is to be returned to the parking position. In this case it is unnecessary to have a sensor means for detecting the presence of a tool on the robot arm as in the worst case if a tool is dislodged from the arm only one cycle will be carried out incorrectly. In a further embodiment of the invention, not shown, the second counterweight does not fall onto the first counterweight directly but is caught by support means on the first wire.

In another embodiment of the invention (not shown) the second counteracting means comprises a force exerting means such as a motor or actuator or the like connected to the first counteracting means. For example the first wire which is attached to the tool can pass over a low-friction supporting means such as a pulley which is attached to a force exerting means instead of being attached to the frame of the stall. This force exerting means can be actuated to move the pulley to retract the tool. Alternatively the force exerting means could be attached to the first counterweight or its wire.

The actuating means can naturally be any suitable means such as electric motors, vacuum cylinders, linear actuators. etc.

The sensor system can be any suitable type of sensor and does not have to be directly attached to the robot arm. It could be, for example, a video system.

What is claimed is:

1. A retraction device for a milking robot, the device comprising:

a robot arm adapted to releasably pick up at least one retractable tool connected to a service cable;

first counteracting means for counterbalancing the weight of said cable;

second counteracting means for selectively exerting a force equal or greater than the weight of said tool onto said first counteracting means; and sensor means for detecting the presence or absence of said tool on said arm; said sensor means being structured and arranged to control said second counteracting means depending on said detection.

2. The retraction device according to claim 1, wherein said force exerted by said second counteracting means is superimposed onto said first counteracting means when said sensor means detects the absence of said tool on said robot arm.

3. The retraction device according to claim 1, wherein said force exerted by said second counteracting means is removed from said first counteracting means when said sensor means detects the presence of said tool on said robot arm.

4. The retraction device according to claim 1, wherein said second counteracting means comprises a counterweight means movable by force exerting means.

5. Method for retracting tools for use in a milking robot having a robot arm able to releasably pick up at least one retractable tool connected to a service cable, the method comprising:

providing first counteracting means for counterbalancing the weight of said cable;

providing second counteracting means able to exert a force equal to or greater than the weight of said tool;

providing means for selectively superimposing the force of said second counteracting means onto said first counteracting means;

providing sensor means for detecting the presence or absence of said tool on said arm; and controlling said second counteracting means depending on said detection by the sensor means.

6. The method according to claim 5, further comprising superimposing the force of said second counteracting means onto said first counteracting means when said sensor means detects the absence of said tool on said arm.

7. The method according to claim 5, further comprising removing the force of said second counteracting means into side first counteracting means when said sensor means detects the presence of said tool on said arm.

* * * * *